(12) United States Patent
Rigault et al.

(10) Patent No.: US 7,969,969 B2
(45) Date of Patent: Jun. 28, 2011

(54) SIGNALLING GATEWAY

(75) Inventors: Anne Rigault, Roquefort (FR); Philippe Bouckaert, Biot (FR); Laurent Cavalier, Villeneuve-Loubet (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 11/822,353

(22) Filed: Jul. 5, 2007

(65) Prior Publication Data

US 2008/0186986 A1 Aug. 7, 2008

(30) Foreign Application Priority Data

Jul. 31, 2006 (EP) ..................................... 06300840

(51) Int. Cl.
*H04L 12/66* (2006.01)

(52) U.S. Cl. ......... 370/353; 370/354; 370/356; 370/355

(58) Field of Classification Search .................. 370/389, 370/522, 235, 401, 352–356; 714/776; 379/201, 379/114; 455/466; 709/224
See application file for complete search history.

(56) References Cited

U.S. PATENT DOCUMENTS

| 5,852,660 | A  | * | 12/1998 | Lindquist et al. | ............. | 379/230 |
| H001895 | H | * | 10/2000 | Hoffpauir et al. | ............. | 455/433 |
| 6,208,657 | B1 | * | 3/2001 | Dendi et al. | ................. | 370/401 |
| 6,333,931 | B1 | * | 12/2001 | LaPier et al. | ................. | 370/385 |
| 6,490,451 | B1 | * | 12/2002 | Denman et al. | ............... | 455/436 |
| 6,515,997 | B1 | * | 2/2003 | Feltner et al. | ................. | 370/401 |
| 6,539,237 | B1 | * | 3/2003 | Sayers et al. | .................. | 455/555 |
| 6,731,741 | B1 | * | 5/2004 | Fourcand et al. | ........ | 379/221.08 |
| 6,801,523 | B1 | * | 10/2004 | Osman | .......................... | 370/352 |
| 6,920,144 | B2 | * | 7/2005 | Niermann | ..................... | 370/401 |
| 6,937,596 | B2 | * | 8/2005 | Sjolund et al. | ................. | 370/352 |
| 6,978,313 | B1 | * | 12/2005 | Pietrowicz | ..................... | 709/238 |
| 7,046,788 | B2 | * | 5/2006 | Schmechel et al. | ...... | 379/221.08 |
| 7,328,032 | B2 | * | 2/2008 | Billing et al. | ................. | 455/466 |
| 7,466,710 | B1 | * | 12/2008 | Clemm et al. | ................. | 370/401 |

(Continued)

FOREIGN PATENT DOCUMENTS

EP 1 398 976 5/2005

(Continued)

OTHER PUBLICATIONS

The Simulation of TCAP Over IP; Dong Zhou; A dissertation submitted to the Graduate Faculty of North Carolina State University in partial fulfillment of the requirements for the Degree of Master of Science; Raleigh 2000.*

(Continued)

*Primary Examiner* — Salman Ahmed

(57) ABSTRACT

A signalling gateway for transmitting messages between a first network and a second network, where the first network comprises an SS7 network and the second network comprises an IP network, the second network comprising a plurality of application servers, the signalling gateway being operable to store SS7 characteristic information corresponding to the application servers, the signalling gateway being operable to receive a message via the first network, the message comprising destination information and origin information identifying a calling entity, read the destination information and identify an application server in accordance with the destination information, transmit the message to the application server, the message comprising the destination information and origin information, receive a response from the application server, the response comprising a destination identifier corresponding to the origin information and an origin identifier corresponding to the destination information, substitute the SS7 characteristic information in the response for the origin identifier, and forward the response via the first network to the calling entity.

8 Claims, 4 Drawing Sheets

U.S. PATENT DOCUMENTS

| | | | |
|---|---|---|---|
| 2001/0002198 A1* | 5/2001 | Lindgren et al. | 370/466 |
| 2001/0036173 A1* | 11/2001 | Shmulevich et al. | 370/352 |
| 2002/0131400 A1* | 9/2002 | Tinsley et al. | 370/352 |
| 2003/0061205 A1* | 3/2003 | Cleghorn et al. | 707/3 |
| 2004/0010464 A1* | 1/2004 | Boaz | 705/40 |
| 2004/0052247 A1* | 3/2004 | Stahl et al. | 370/352 |
| 2004/0081206 A1* | 4/2004 | Allison et al. | 370/522 |
| 2004/0224680 A1* | 11/2004 | Jiang | 455/433 |
| 2005/0070278 A1* | 3/2005 | Jiang | 455/432.3 |
| 2005/0075106 A1* | 4/2005 | Jiang | 455/432.3 |
| 2005/0136832 A1* | 6/2005 | Spreizer | 455/3.02 |
| 2005/0192035 A1* | 9/2005 | Jiang | 455/461 |
| 2005/0238036 A1* | 10/2005 | Miller et al. | 370/401 |
| 2005/0238048 A1* | 10/2005 | Delaney et al. | 370/466 |
| 2006/0161626 A1* | 7/2006 | Cardina et al. | 709/206 |
| 2006/0198334 A1* | 9/2006 | Civanlar et al. | 370/328 |
| 2006/0276226 A1* | 12/2006 | Jiang | 455/558 |
| 2007/0093260 A1* | 4/2007 | Billing et al. | 455/466 |
| 2007/0124802 A1* | 5/2007 | Anton et al. | 726/3 |
| 2007/0140262 A1* | 6/2007 | Wang | 370/395.52 |
| 2007/0243891 A1* | 10/2007 | Civanlar et al. | 455/466 |
| 2007/0281687 A1* | 12/2007 | Jiang | 455/433 |
| 2007/0291733 A1* | 12/2007 | Doran et al. | 370/352 |
| 2007/0293216 A1* | 12/2007 | Jiang | 455/433 |
| 2008/0025295 A1* | 1/2008 | Elliott et al. | 370/356 |
| 2008/0125116 A1* | 5/2008 | Jiang | 455/433 |
| 2008/0125117 A1* | 5/2008 | Jiang | 455/433 |
| 2008/0130663 A1* | 6/2008 | Fridman et al. | 370/401 |
| 2008/0186986 A1* | 8/2008 | Rigault et al. | 370/401 |
| 2008/0293408 A1* | 11/2008 | Jiang | 455/433 |
| 2009/0168982 A1* | 7/2009 | Gonder et al. | 379/142.04 |
| 2010/0048197 A1* | 2/2010 | Jiang | 455/422.1 |

FOREIGN PATENT DOCUMENTS

| | | |
|---|---|---|
| EP | 1 643 777 | 4/2006 |
| WO | 03/065660 | 8/2003 |

OTHER PUBLICATIONS

Analysis of Real-time Fax over IP (FoIP) Using Simulation; M Khosroshahy—2004.*

SS7 over IP: signaling interworking vulnerabilities; Hemant, S.; Dantu, R.; Wijesekera, D.; Jajodia, S.; Network, IEEE vol. 20, Issue: 6 Digital Object Identifier: 10.1109/MNET.2006.273119 Publication Year: 2006.*

* cited by examiner

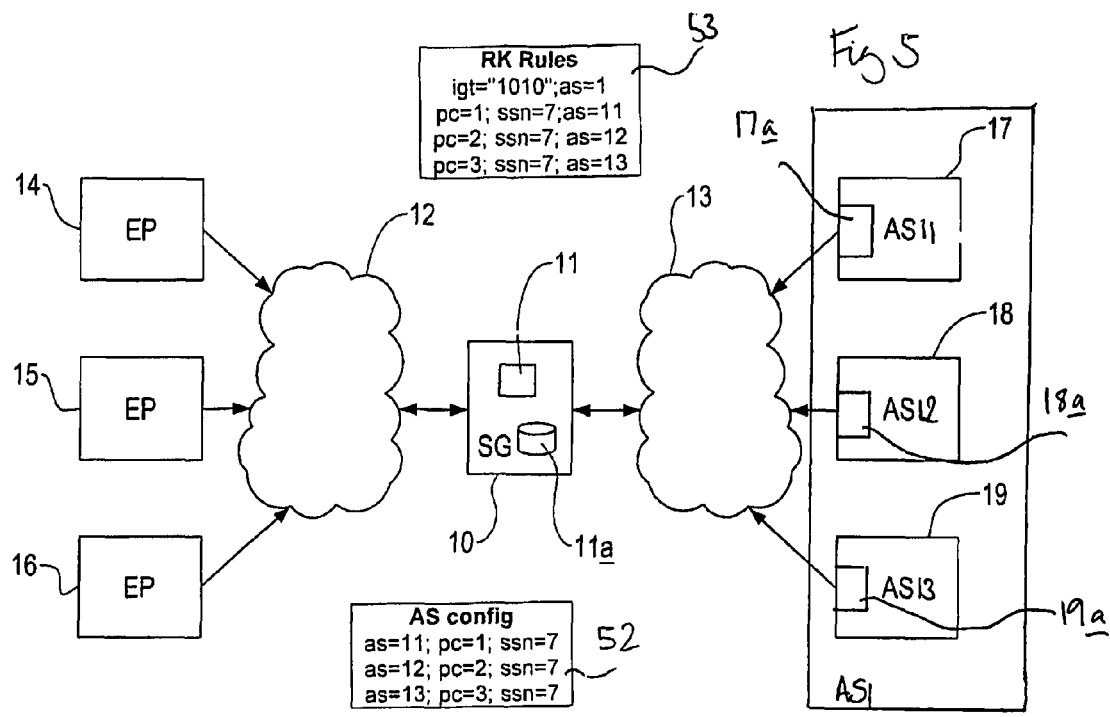

SIGNALLING GATEWAY

This application claims priority from European Patent Application 06300840.3, filed on Jul. 31, 2006. The entire contents of the aforementioned application is incorporated herein by reference.

FIELD OF THE INVENTION

This invention relates to a signalling gateway and a system enclosing a signalling gateway and an application server.

BACKGROUND OF THE INVENTION

A common problem when connecting networks is that of ensuring messages from one network are correctly routed to a destination on an other network. A particular example of this is in the connection of networks using Internet Protocol (IP) to an existing telephone switched circuit network (PSTN). The infrastructure uses very different technologies and protocol: for example a PSTN uses the SS7 protocol, and it is desirable to provide PSTN signalling over an IP network reliably.

A number of approaches to providing a reliable connection between IP and SS7 networks have been proposed by the Internet Engineering Task Force (IETF). These include SUA which defines the protocol for the transport of any SCCP user signalling over IP. Two main entities are defined: the signalling gateway ("SG"), which is the connection point between the SS7 and IP networks, and the application server (AS) which is the software application provided on the IP network which it is desired to make available over the SS7 network. The protocol may be used to connect SS7-based signalling end points (SEP) with an IP based AS thus allowing SS7 networks to access IP based applications.

A function performed by the signalling gateway is to receive SS7 signalling messages and direct them to the appropriate AS. To do so, the SG identifies a routing key (RK) defined by the SUA protocol, which uniquely identifies the AS in accordance with parameters in the SS7 message. In general, the RK parameters are found in the header of the SS7 message, although it may be desirable to take into account other elements of the message, such as some aspect of the message content, in order to direct the message to the appropriate AS.

Accordingly, each application server behaves like an SS7 SEP, including SS7 characteristic information including a point code and a subsystem number. When it receives a message and generates a response, it will include its point code and subsystem number in the response to permit the SS7 SCP point or signalling end point to know the origin of the response. In a signalling gateway, the SCCP layer defines services which are identified with an SSN, and so the SSN and PC corresponding to an application server may be used to appropriately route messages from the SS7 and IP networks.

A problem with such a system however, is that each application server must be configured with information which is required by the SS7 network. Further, one internet network service could be provided by a number of application servers and equally, an application server could provide many separate services, in which case the specific one-to-one matching of point codes and signalling entities required by SS7 signalling is inappropriate. If it is desired to add new application servers or services on an IP network, the signalling gateway and the new application servers must be configured accordingly to avoid instability or traffic routing errors.

SUMMARY OF THE INVENTION

According to a first aspect of the invention, we provide a signalling gateway for transmitting messages between a first network and a second network, where the first network comprises an SS7 network and the second network comprises an IP network, the second network may comprise a plurality of application servers, the signalling gateway being operable to store SS7 characteristic information corresponding to the application servers, the signalling gateway being operable to receive a message via the first network, the message comprising destination information and origin information identifying a calling entity, read the destination information and identify an application server in accordance with the destination information, transmit the message to the application server, the message may comprise the destination information and origin information, receive a response from the application server, the response may comprise a destination identifier corresponding to the origin information and an origin identifier corresponding to the destination information, substitute the SS7 characteristic information in the response for the origin identifier, and forward the response via the first network to the calling entity.

The destination information may comprise a global title.

The destination information may correspond to a virtual destination and the step of identifying an application server in accordance with the destination information may comprise selecting an application server to receive the message.

The application server may not provide the SS7 characteristic information to the signalling gateway.

The SS7 characteristic information may be statically configured at the signalling gateway.

According to a second aspect of the invention, we provide a system comprising a signalling gateway according to the first aspect of the invention and an application server provided on the second network, the application server being operable to receive the message from the signalling gateway, read the destination information and the origin destination, generate a response, the response comprising a destination identifier corresponding to the origin information and an origin identifier corresponding to the destination information, and send the response to the signalling gateway.

The application server may not modify the destination information or the origin information when generating the response.

BRIEF DESCRIPTION OF THE DRAWINGS

An embodiment of the invention will be described by way of example only with reference to the accompanying drawings, wherein:

FIG. 5 is a diagrammatic illustration of a network configured in accordance with the present invention.

DETAILED DESCRIPTION OF THE PREFERRED EMBODIMENTS

Figure 1:
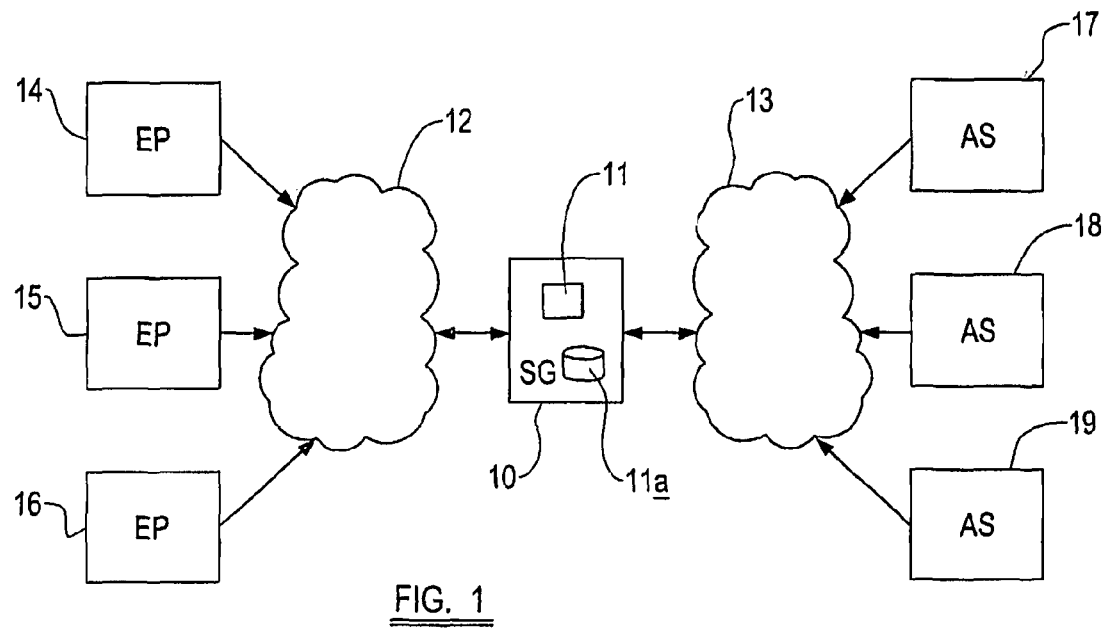
FIG. 1 is a diagrammatic illustration of a communication network.
Figure 2:
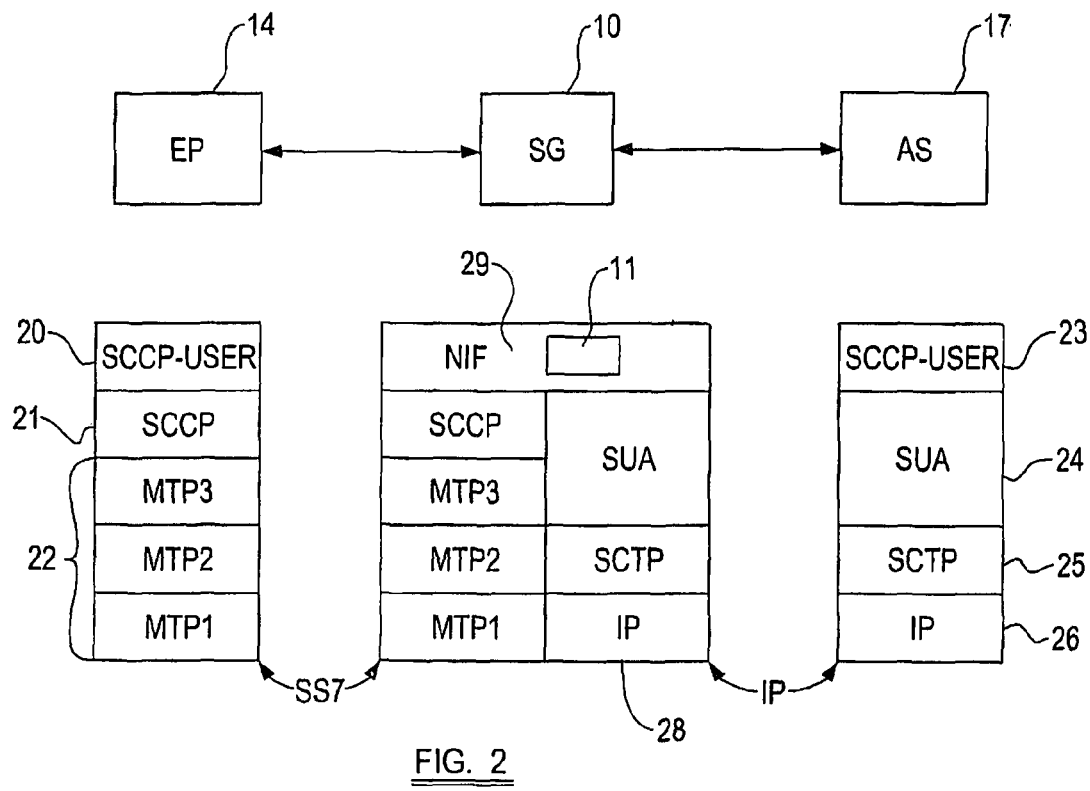
FIG. 2 is a diagrammatic illustration of the protocol stack of the network of FIG. 1.

Referring to FIG. 1, a signalling gateway embodying the present invention is shown at 10, provided with a routing key interpreter 11. The signalling gateway 10 is operable to communicate over a first network 12 and send and receive messages to and from end points on the network 12 using a first protocol, in this example using the SS7 protocol. The signalling gateway 10 is also able to communicate over the second network 13, in this example using the IP protocol. The signalling gateway 10 is operable to send and receive messages via the first network 12 from a plurality of end points 14, 15, 16, and to transmit and receive messages over the second network 13 from a plurality of application servers 17, 18, 19. As best seen in FIG. 2, the protocols used for transmitting messages over the first network 12 comprises a Signalling Connection Control Part (SCCP) User Part 20 over the SCCP 21 and then the appropriate Message Transfer Protocol (MTP) levels shown at 22. The application servers transmit messages using an SCCP User Part shown at 23 over a SCCP User Adaptation layer (SUA) 24, and uses the Stream Control Transmission Protocol (SCTP) 25 over the Internet Protocol (IP) layer 26. The signalling gateway architecture generally shown at 28 has a nodal interworking function (NIF) illustrated at 29 to convert SS7 messages to SUA messages and vice versa using the routing key interpreter generally indicated at 11. The signalling gateway 10 may sit between any other appropriate pair of protocols as desired; for example, the signalling gateway 10 may be operable to convert SS7 signals to M3UA messages or otherwise as desired.

Each application server 17, 18, 19 has a unique routing key associated with it. The routing keys may be configured statically at the application server 17, 18, 19 and at the signalling gateway, or maybe configured statically at the application server which then dynamically registers itself at the signalling gateway 10 by means of routing key management messages. The routing keys are stored in a store shown at 11a. To match a routing key to an incoming message, the routing key interpreter 11 is operable to read a message and identify the values of certain parameters within the message. The routing key interpreter 11 then identifies the routing key that matches the values of the parameters and returns an output.

The signalling gateway 10 will then send the message to the appropriate application server 17, 18, 19 depending on the output from the routing key interpreter.

The signalling gateway 10 further stores SS7 characteristic information corresponding to the servers on the data store 11a. In particular, the SS7 characteristic information may comprise at least a point code and subsystem number associated with each respective application server 17, 18, 19. The SS7 characteristic information may also include, for example a Global Title value. The SS7 characteristic information is held only at the signalling gateway 10. The application servers 17, 18, 19 are not aware of the associated SS7 characteristic information and thus do not need to store or otherwise use or supply associated SS7 data as will be discussed below.

Figure 3:
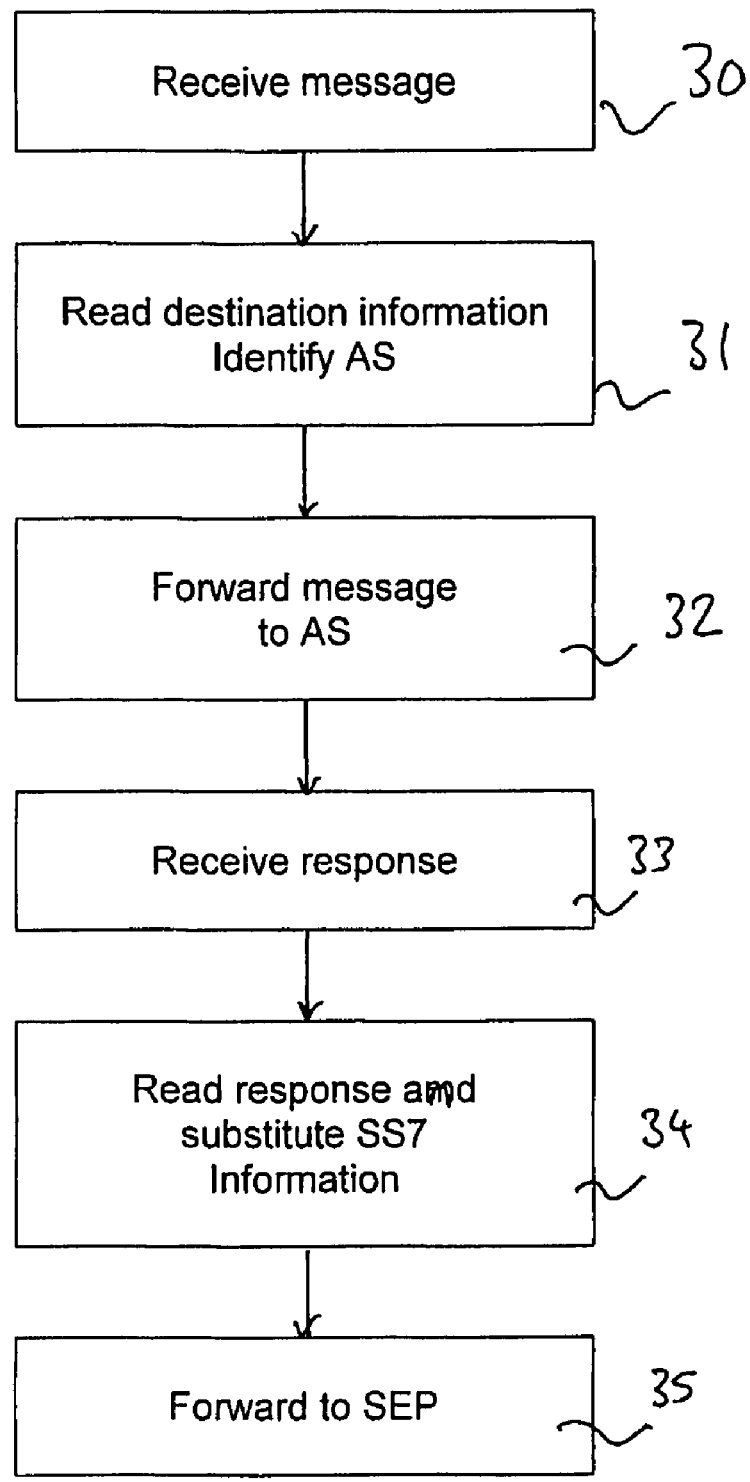
FIG. 3 is a flow diagram of a method of operating a signalling gateway embodying the present invention.

The signalling gateway 10 is operable as follows, with reference to FIG. 3. At step 30, the signalling gateway receives a message from the first network 12 and at step 31 reads the destination information and identifies an application server, and at step 32 forwards the message to the application server. At step 33 the signalling gateway receives a response from the application server, in which the destination information and origin information in the original message have simply been reversed so that the response comprises a destination identifier corresponding to the origin information and an origin identifier corresponding to the destination information. At step 34, the signalling gateway 10 reads the response and if appropriate substitutes appropriate SS7 characteristic information which is read from the store 11a and corresponds to the application server, and at step 35 sends the response to the calling entity over the first network.

In generating the response, the application server 17, 18, 19 has generated a response comprising a destination identifier and an origin identifier, corresponding to the origin information and the destination information respectively. Essentially, the application server 17, 18, 19 has simply reversed the destination and origin information from the original message, thus requiring no further action or modification of the information by the application server 17, 18, 19 when generating the response, and in particular requiring no knowledge of the SS7 characteristic information at the application server 17, 18, 19.

Figure 4:
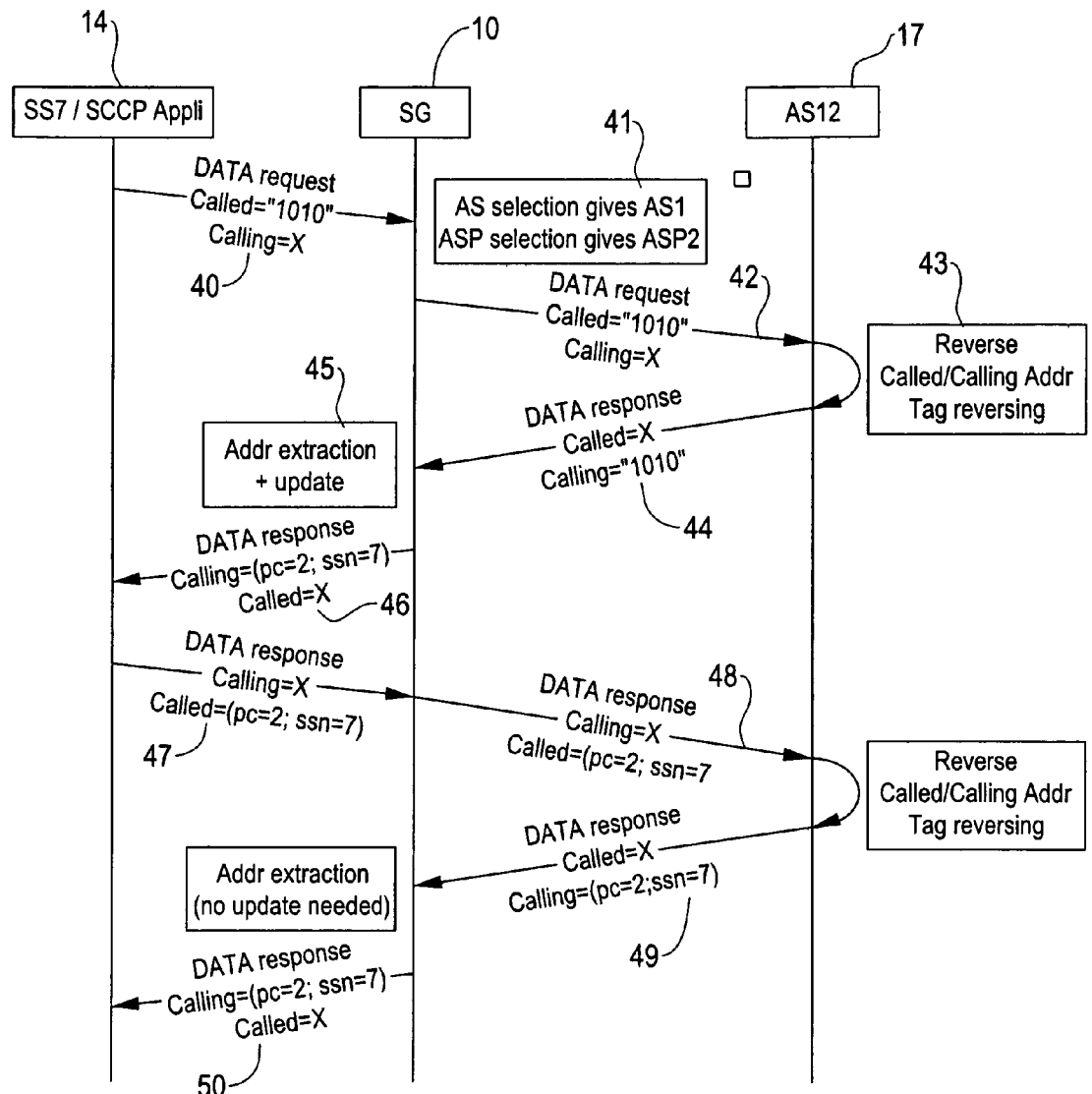
FIG. 4 is a diagrammatic illustration of a message exchange with a signalling gateway embodying the present invention.

An example of a message exchange sequence is illustrated in FIG. 4. As an example, at step 40 a data request is received from SS7 entity 14. The data request has a global title as the calling address, herewith value 1010, and gives the calling address x of the SCP 14. As illustrated at 41, the signalling gateway 10 reads the destination and origin information in the message and selects a particular application server and application server process, in this example corresponding to an application server process provided on application server 17. At 42, the message is forwarded with the called and calling data as received. At step 43, the application server 17 generates a response, and simply reverses the called address and calling address and at step 44 sends a response back to the signalling gateway 10. At step 45, the signalling gateway 10 reads the response, and extracts the SS7 characteristic information associated with the application server from the store 11a. As the response has a global title in the calling address; the substitution is performed by a GT translator which replaces the global title with a 'real' destination, in this case the PC and SSN. The SS7 information is inserted in the calling party tag of the response, and at step 46 the response is sent to the SEP 14.

In subsequent messages, no modification is required. As illustrated at 47, a subsequent response will use the SS7 characteristic information corresponding to the application server 17 and at step 48 will simply be forwarded by the signalling gateway 10 to the application server 17. At 49, the response is returned by the application server 17 with the called and calling addresses reversed and at step 50 the response is forwarded to the end point 14 with no modification to the called or calling address required.

Thus, it will be apparent that the SS7 network 12 and IP network 13 are essentially completely separated, with the signalling gateway providing the necessary translation between the two network protocols. The application servers are not concerned with SS7 characteristic information, and so thus are not handling information which is irrelevant to the network to which they are connected. The configuration data is data handled essentially at the signalling gateway, including the routing key rules and extended configuration information. Changes can be made to the entities on the IP network 13 and simply registered at the signalling gateway 10 in an appropriate manner. Further, by operating the signalling gateway in this manner there is no conflict provided the SUA or SCCP protocols.

The operation of the signalling gateway in this manner permits flexible provision of services and application servers on the IP network, as there is no necessary one-to-one correlation between services and point code values. For example, in FIG. 5 the three application servers 17, 18, 19 are grouped as a single virtual application server AS1. Each application server 17, 18, 19 has at least one associated application server process 17a, 18a, 19a respectively. The SS7 characteristic information is stored at the signalling gateway 10, generally illustrated at 52, and the routing key rules held at the signalling gateway server are generally illustrated at 53. Essentially, the SS7 characteristic information 52 associates a point code and a subsystem number with each of the application servers 17, 18, 19. In this example, each point code is different but the subsystem number 7 is the same, as in this example each application server provides the same service. The routing key rules 53 are stored so that a particular global title corresponds to the virtual application server 51 and the particular combination of point codes and subsystem numbers are matched to the corresponding application server 17, 18, 19. When a message is received over the SS7 network 12 with global title 1010, it is to be directed to the virtual application server 1 to access a service provided by the virtual application server. The signalling gateway 10 will select an appropriate application server in accordance with any particular criteria, such as availability, load balancing or otherwise, and forward the message to the application server 17, 18, 19. When the response is received, as illustrated in FIG. 4, the signalling gateway 10 will substitute the appropriate SS7 characteristic information from the store 52 into the response, before forwarding it to the entity of the SS7 network 12. Subsequent messages from the SS7 network 12 will then contain the correct point code and subsystem number and be forwarded to the appropriate application server 17, 18, 19. Consequently, a service can be provided using multiple application servers in a way which is completely transparent to the requesting entities on the SS7 network.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A signalling gateway (10) for transmitting messages between a first network (12) and a second network (13), where the first network (12) comprises an SS7 network and the second network comprises an IP network, the second network (13) comprising a plurality of application servers (17, 18, 19),
   the signalling gateway being operable to store SS7 characteristic information corresponding to the applications servers,
   the signalling gateway being operable to receive a message via the first network, the message comprising a global title value associate with a virtual application server and origin information identifying a calling entity, said virtual application server implemented by a plurality of physical application servers,
   read the global title value and select one of the physical application servers implementing the virtual application server,
   transmit the message to the selected physical application server, the message comprising the global title value and origin information,
   receive a response from the selected physical application server, the response comprising a destination identifier corresponding to the origin information and an origin identifier corresponding to the global title value,
   substitute the SS7 characteristic information in the response for the origin identifier in place of the global title value, and
   forward the response via the first network to the calling entity.

2. A signalling gateway according to claim 1 wherein the application server does not provide the SS7characteristic information to the signalling gateway.

3. A signalling gateway according to claim 2 wherein the SS7 characteristic information is statically configured at the signalling gateway.

4. A system comprising a signalling gateway according to claim 1 and an application server provided on the second network, the application server being operable to receive the message from the signaling gateway, read the global title value and the origin destination, generate a response, the response comprising a destination identifier corresponding to the origin information and an origin identifier corresponding to the global title value, and send the response to the signalling gateway.

5. A system according to claim 4 wherein the application server does not modify the global title value or the origin information when generating the response.

6. A method, comprising:
   receiving, by a signalling gateway, a first message from a calling entity on a first network, the first message comprising a global title value associate with a virtual application server and origin information identifying a calling entity, said virtual application server implemented by a plurality of physical application servers;
   load balancing, by the signalling gateway, by selecting one of the plurality of physical application servers to process the first message;
   transmitting the first message to the selected physical application server, the first message comprising the global title value and origin information;
   receiving, by the signalling gateway, a response from the selected physical application server, the response comprising a destination identifier corresponding to the origin information and an origin identifier corresponding to the global title value,
   substituting, by the signalling gateway, SS7 characteristic information in the response for the origin identifier in place of the global title value,
   forwarding the response via the first network to the calling entity;
   receiving, by the signalling gateway, a second message from the same calling entity destined for the previously selected physical application server; and
   forwarding, by the signalling gateway, a second response from the selected physical application server back to the calling entity without substituting SS7 characteristic information in the second response for the origin identifier in place of the global title value.

7. The method of claim 6 further comprising not providing the SS7characteristic information to the signalling gateway.

8. The method of claim 6 further comprising statically configuring, by the signalling gateway, the SS7 characteristic information.

* * * * *

UNITED STATES PATENT AND TRADEMARK OFFICE
CERTIFICATE OF CORRECTION

| | |
|---|---|
| PATENT NO. | : 7,969,969 B2 |
| APPLICATION NO. | : 11/822353 |
| DATED | : June 28, 2011 |
| INVENTOR(S) | : Anne Rigault et al. |

It is certified that error appears in the above-identified patent and that said Letters Patent is hereby corrected as shown below:

In column 6, line 9, in Claim 2, delete "SS7characteristic" and insert -- SS7 characteristic --, therefor.

In column 6, line 58, in Claim 7, delete "SS7characteristic" and insert -- SS7 characteristic --, therefor.

Signed and Sealed this
Twenty-fourth Day of July, 2012

David J. Kappos
*Director of the United States Patent and Trademark Office*